Jan. 9, 1940. R. O. BERG ET AL 2,186,061
TUBE CUT-OFF APPARATUS
Filed July 22, 1938 5 Sheets-Sheet 3

INVENTORS.
RICHARD O. BERG.
BY SIMON BERG.
Barnes, Kisselle, Laughlin & Reisch
ATTORNEYS.

Patented Jan. 9, 1940

2,186,061

UNITED STATES PATENT OFFICE 2,186,061

TUBE CUT-OFF APPARATUS

Richard O. Berg and Simon Berg, Detroit, Mich., assignors to Michigan Steel Tube Products Company, Detroit, Mich., a corporation of Michigan Application July 22, 1938, Serial No. 220,668

19 Claims. (Cl. 164—60)

This invention relates to an apparatus for cutting tubing or pipe into lengths from tubing or pipe which is being advanced with continuous movement. More particularly, the invention relates to a tube cut-off machine for association with a tube forming machine so that determined lengths of tube or pipe are cut off from the tubing which is made in indeterminate lengths.

One of the principal objects of the invention is to provide an improved cut-off device which will give a cleaner and more accurate cut-off than devices heretofore known. More particularly, the apparatus cuts the tube with a lathe-like action, and to this end involves a rotary head carrying cutting tools which revolve around the tube and which are advanced for cutting purposes. Some tube cut-off devices employ cutting rollers or rotary cutting elements, but these crowd the metal and more or less bevel or flange the tube at the point of severance. Furthermore, to facilitate a nicety of severance, the invention contemplates an apparatus which will grip the tube with a vise-like action, preferably on both sides of the cutting tools so that the tube is firmly held during the cutting action. This makes for increased accuracy. The cutting instruments and the gripping devices are mounted on a carriage arranged to move with the movement of the tube during the cutting action. The carriage is reciprocable in that after a cutting action has been terminated the carriage moves back to its original position to again engage and cut the moving tube at a determined location. The carriage is preferably moved by a power independently of the tube so that even though the tube is gripped, the tube is not called upon to shift the carriage. Another phase of the invention is the provision of means for moving the carriage and certain controls and timing elements. More specifically, the carriage is moved, and various other controls and movements are effected hydraulically and the functioning of the hydraulic apparatus is controlled from the moving tube, and electrical controlling means may be used for this purpose.

The general objects and other objects will be better understood as the detailed description progresses in connection with the accompanying drawings.

In these drawings an apparatus and hydraulic system are shown, for exemplifying the invention, and although specifically described, it will be appreciated that the structure may be varied within the scope and range of equivalency of the appended claims.

Figures 1, 2:
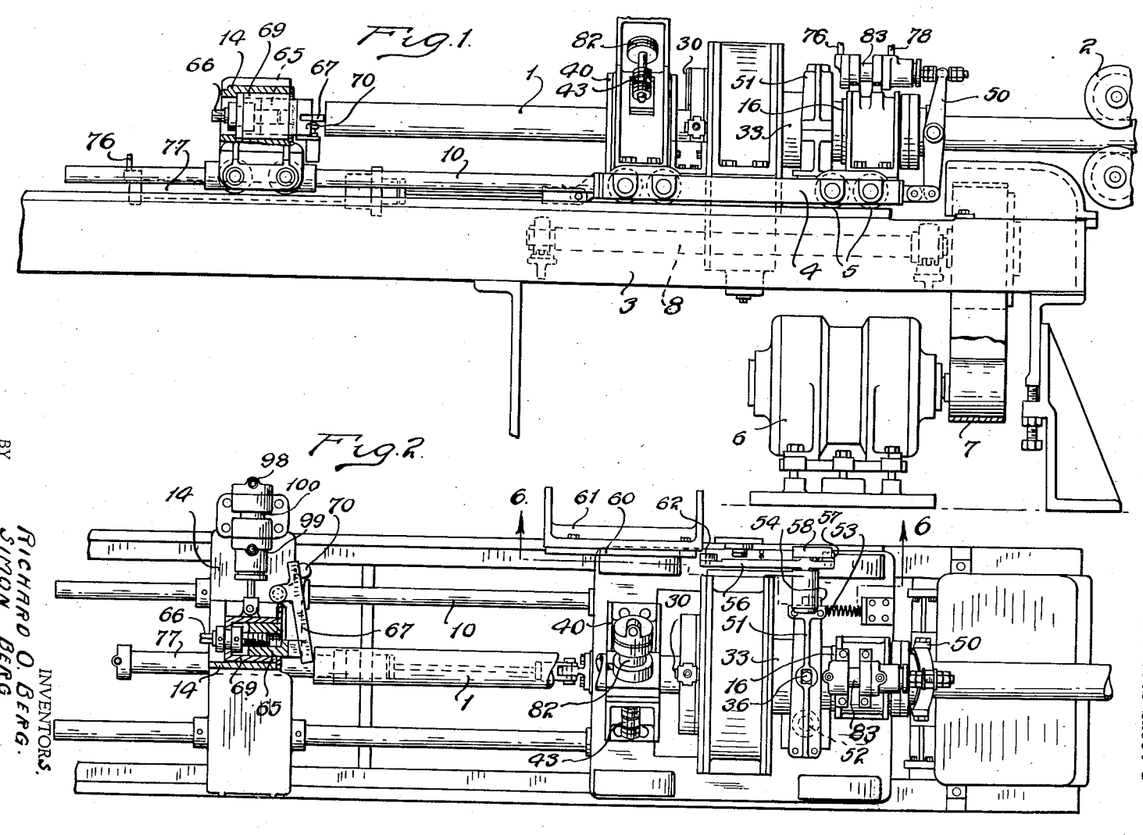
Fig. 1 is a side elevational view of the tube cut-off apparatus illustrating a tube in position.
Fig. 2 is a top plan view of the device shown in Fig. 1.

The tube which is to be worked upon is indicated at 1 and in Fig. 1 rollers 2 are illustrated which may be the final instruments of a tube forming and welding machine. The tube 1 may be fashioned from strip metal stock with the abutting edges welded in the welding machine so that tube is in finished form as it leaves the rollers 2. The tube advances with continuous movement and passes into the cut-off apparatus where sections of definite length are successively severed.

Figure 3:
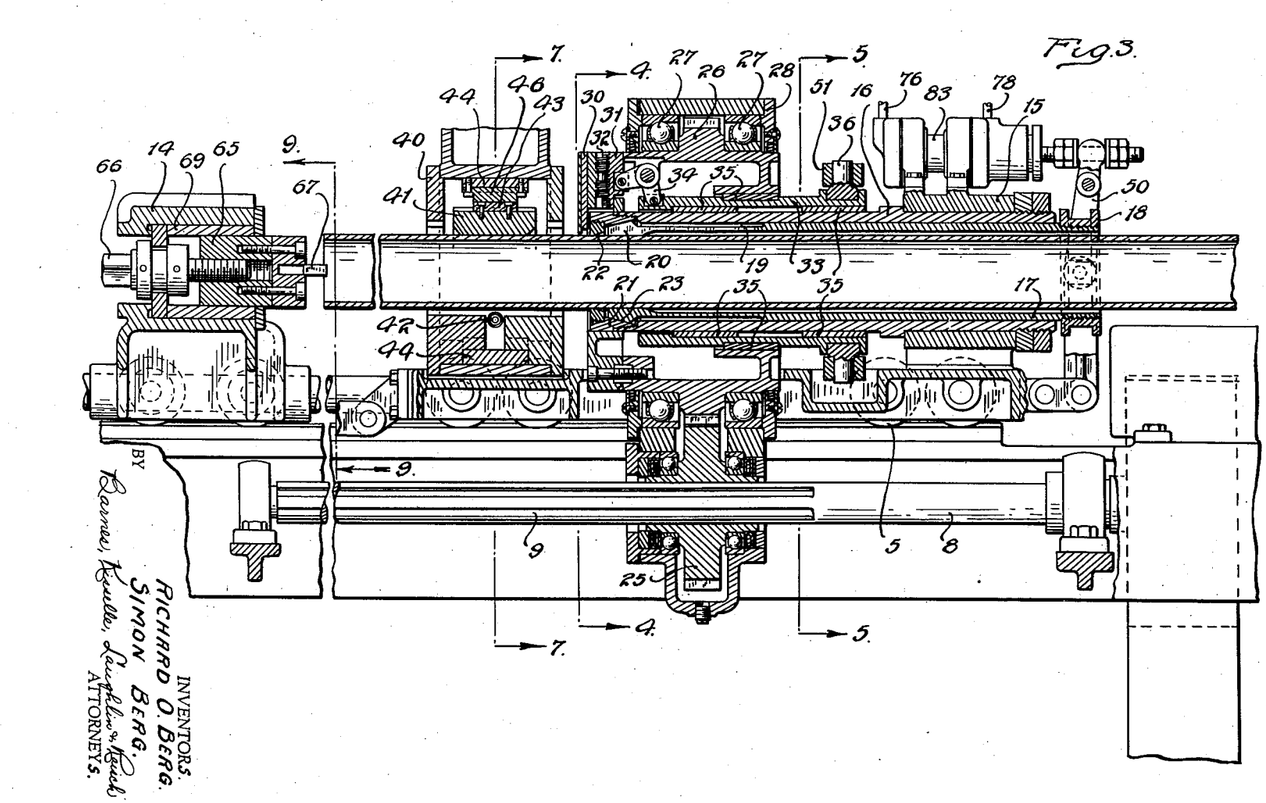
Fig. 3 is an enlarged cross sectional view taken through the cut-off and clamping devices.

The device comprises a suitable support or table 3 upon which is mounted a carriage 4 for reciprocable movement, the carriage having rollers 5 operating on tracks or runways as illustrated. A suitable motor is illustrated at 6 connected by means of a belt or silent chain 7 to the pulley of a shaft 8 journaled in the support 3 and having splines 9 running for a considerable length thereof (Fig. 3).

Figures 4, 11:
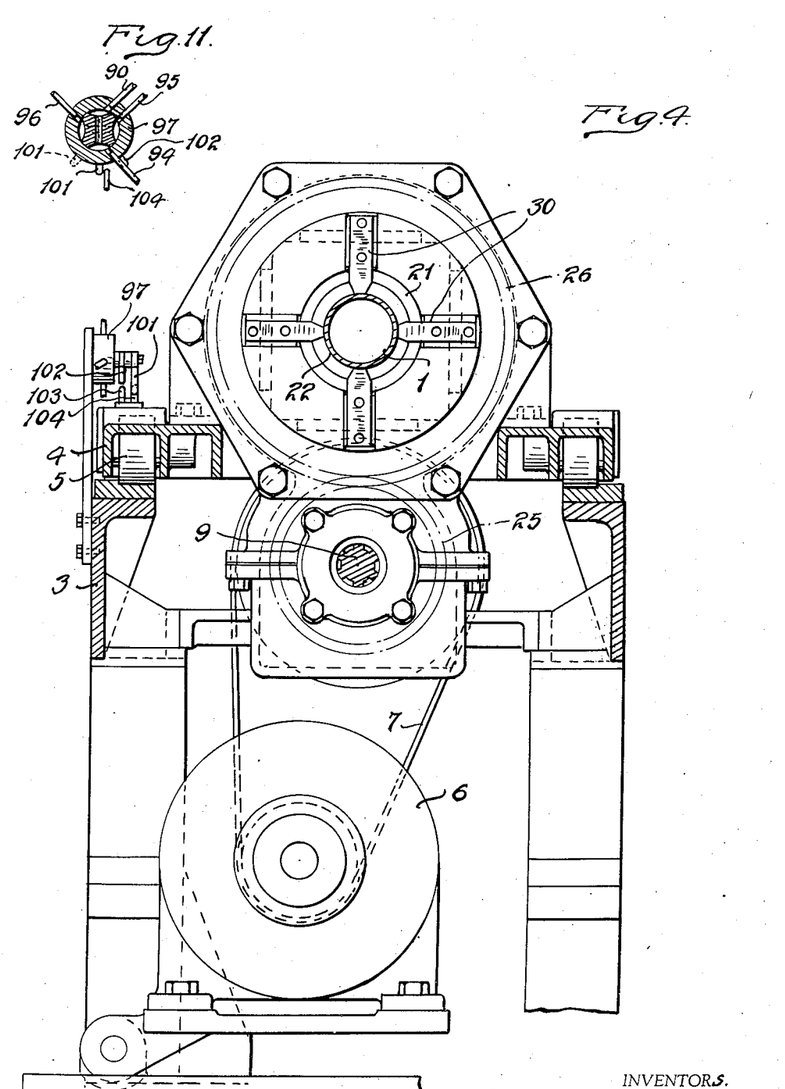
Fig. 4 is a view taken substantially on line 4—4 of Fig. 2 illustrating the cutting tools and other associated parts.
Fig. 11 is an enlarged cross sectional detail showing the pilot valve.
Figure 5:
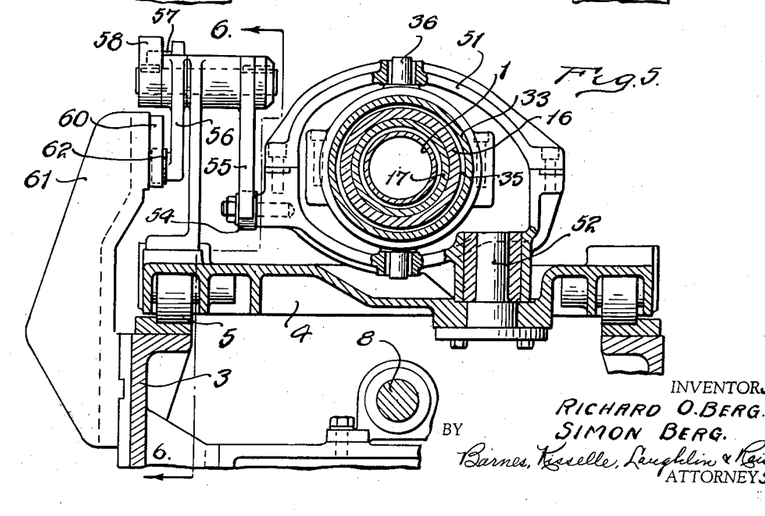
Fig. 5 is an enlarged cross sectional view taken substantially on line 5—5 of Fig. 3 showing certain control mechanism for some of the clamping instrumentalities.

In advance of the carriage and connected thereto by means of rods 10 so as to form a part of the carriage is a carriage member 14 also mounted on rollers as illustrated. The carriage 4 carries the clamping and cut-off mechanism, and the carriage 14 carries devices for engagement with the end of the tube for control purposes. As illustrated in Figs. 3 and 4, the tube passes axially through the clamping and cutting mechanism on the carriage 4. Included on the carriage 4 is a supporting member 15 which supports the structural tubular member 16, the tubular member having a shoulder for engaging the member 15 on one side and being held in position by screw-threaded nuts as illustrated. Reciprocably mounted in the structural tube 16 is another tubular member 17 provided with a grooved collar 18 at one end. At the other end of the tube 17 is a portion which is slotted as at 19 forming tines or fingers, the ends of which have enlarged heads 20 with cam surfaces. A ring 21 is screw-threaded to the structural tube 16 having a circumferential cooperating cam surface and a guide ring 22 may be screw-threaded into the ring 21. The cooperating cam surfaces are both generally indicated at 23. The tube 17 is reciprocable axially, and as it is shifted to the left as Fig. 3 is viewed the cam surfaces function to collapse the heads 20 against the wall of the tube to thereby grip the same. When the tube 17 is reciprocated back to the right, the gripping action ceases.

Mounted in a casing which constitutes a part of the carriage 4 is a gear 25 having a splined connection with the shaft 8. A gear member 26 has teeth meshing with the gear 25. This gear member is mounted in ball bearings 27 in turn mounted in a housing 28. The member 26 is not only a gear member but amounts to a rotary head. This rotary head carries a plurality of circumferentially disposed cutting instruments 30, each carried by a radially shiftable block 31 and each adjustable relative to its block by screw means 32.

Shiftable axially relative to the carriage is a control member 33 connected to bell cranks 34 which are fulcrumed on the head 26 and which are connected to the blocks 31. There is one bell crank for each cutter block. The control member 33 has bearings 35 for accommodating the reciprocable movement and oppositely extending studs 36, by means of which, movement is imparted thereto.

Figures 7, 8:
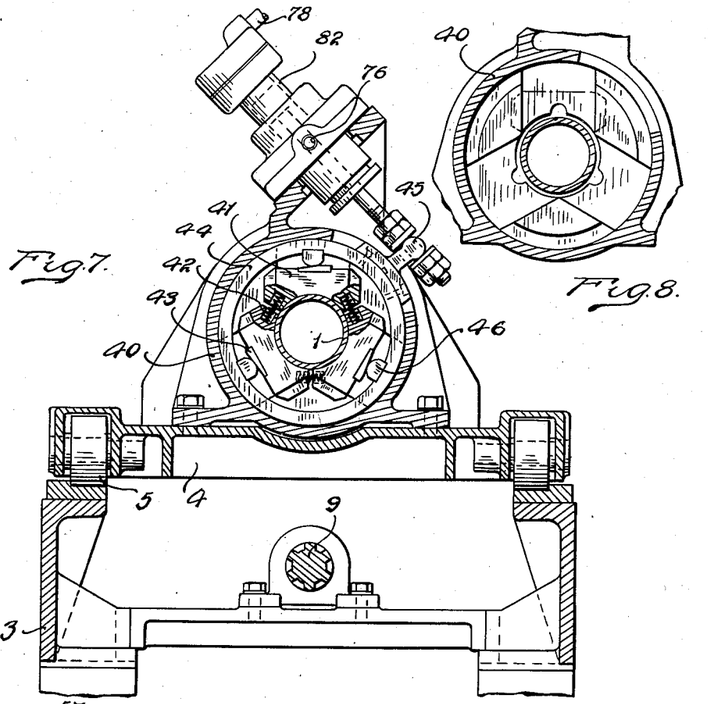
Fig. 7 is an enlarged sectional view taken substantially on line 7—7 of Fig. 3 illustrating another clamping instrumentality.
Fig. 8 is a detailed sectional view illustrating the housing for the clamping devices shown in Fig. 7, but with the devices removed.
Figure 9:
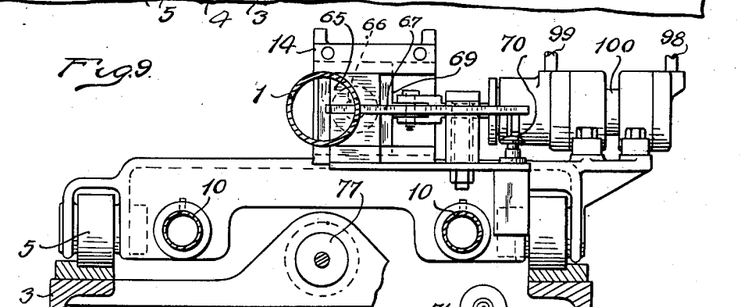
Fig. 9 is a sectional view taken substantially on line 9—9 of Fig. 3 showing control mechanism for engagement with the end of the advancing tube.

Another clamping device resides in a housing 40 on the carriage, in which are clamping devices 41 (Fig. 7) circumferentially arranged and normally held outwardly away from the tube by springs 42, and each having a hardened cam member 43. In this housing is a ring 44 having an arm 45 extending outwardly from the housing to which power is applied for rotating the ring. The ring has cam engaging elements 46, there being one element for each cam element 43. When the ring is rocked clockwise, as Fig. 7 is viewed, the cams shift the clamping devices 41 inwardly to clamp the tube, and when the ring is rocked counterclockwise the clamping action ceases, and the devices shift outwardly due to the springs. This latter position is illustrated in Fig. 8. The clamp tube 17 is reciprocated through the means of a pivotally mounted yoke 50 which engages the grooved collar 18 and which is actuated by a piston in a hydraulic cylinder presently to be described and shown in Fig. 3.

Figure 6:
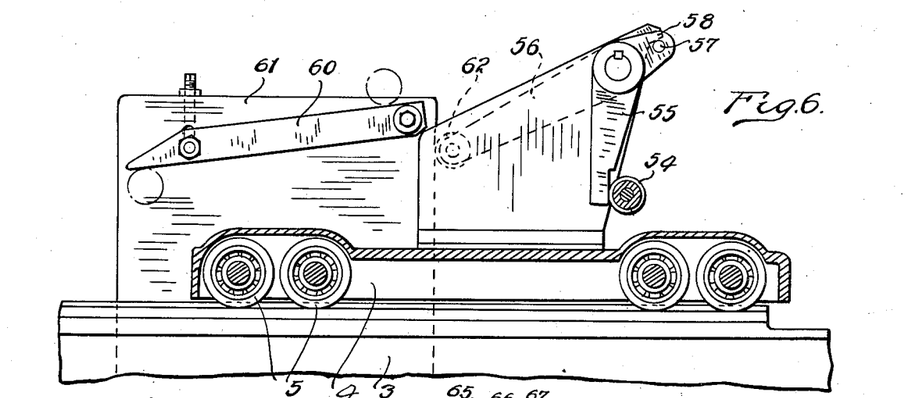
Fig. 6 is an enlarged detail view illustrating operating means for the cutting elements.

The cutters are actuated by the reciprocation of the sleeve 33. This is accomplished mechanically as the carriage travels with the tube. For this purpose there is a yoke 51 with elongated apertures for receiving the studs 36 and this yoke is pivoted at 52 on the carriage and is acted upon by a spring 53. The yoke has a roller 54 for engagement with a pivoted arm 55, (Fig. 6) and the arm 55 is actuated by another arm 56 having the same fulcrum point as the arm 55. The arm 56 has a stud 57 for engaging a finger 58 on the arm 55. An inclined plane element or cam 60 is secured to a fixed part 61 of the table 4, and the arm 56 has a roller 62 which engages the underside of the cam 60. As the carriage is advanced from right to left as Fig. 6 is viewed, the cam 60 shifts the arm 56 counterclockwise, and this causes counterclockwise rocking movement of the arm 55 and this engages the roller 54 and rocks the yoke 51 against the action of the spring 53. This shifts the control sleeve 33 to the right as Fig. 3 is viewed, causes a rocking of the bell cranks 34, and urges the cutters 30 inwardly to cut the tube. Of course, at this time the head 26 and the cutters are rotating around the tube.

The carriage part 14 has a block 65 which is adjustable by the screw member 66, and this block and its carrier 69 are slidable laterally in the body portion 14 of the carriage. This block has a pivoted element 67 positioned to be engaged by the end of the advancing tube, and this pivoted element controls the making and breaking of an electric switch 70.

Before proceeding to describe the electrical and hydraulic control and operating apparatus, it would appear to be well to set forth the function of the cutting apparatus as thus far described. Assuming that the tube is moving into the apparatus as shown in Fig. 3, the end thereof eventually strikes and trips the switch arm 67. This causes a plurality of operations which are performed substantially simultaneously, or at least at about the same time. These are as follows: The carriage begins to shift to the left with the tube; the sleeve 17 is shifted to the left as Fig. 3 is viewed to cause the heads 20 to clamp the tube. The ring 44 is rocked clockwise (Fig. 7) to cause the jaws 41 to clamp the tube. Shortly after the tube is thus clamped, the arm 56 is rocked (Fig. 6) by the cam 60, and this shifts the yoke 51 which in turn shifts the sleeve 33 and through the bell cranks 34 causes the cutters 30 to move inwardly and cut the tube. All this time the head 56 is rotating, and as the head and carriage shift, the head and cutters are rotated due to the splined connection between the gear 25 and shaft 8. Near the end of the movement of the carriage the roller 62 (Fig. 6) moves out from under the cam 60 and the spring 53 quickly returns the cutters to their outer position. Likewise at this time the clamps 20 and 41 are released from the tube and the carriage is shifted back to its initial position.

Figure 10:
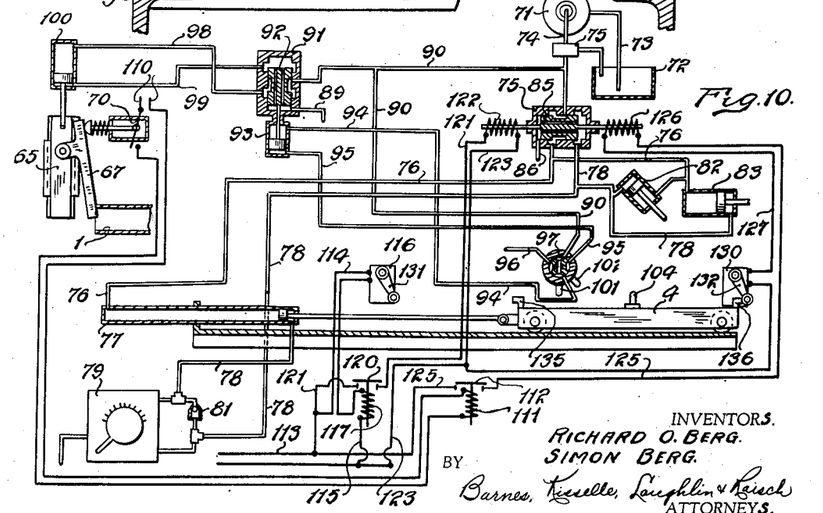
Fig. 10 is a diagrammatic view illustrating the hydraulic and electrical control and operating system.

A diagrammatic illustration of the hydraulic operating apparatus and the electrical controls is shown in Fig. 10. A suitable pump for supplying liquid under pressure is illustrated at 71, the tank or reservoir therefor at 72, from which the liquid is drawn through a pipe line 73, and discharged under pressure through line 74. A relief valve is shown at 75 for by-passing the liquid back into the tank when excess resistance is encountered. The pressure line 74 runs to a main control valve 75 and from this valve extends a line 76 to one end of a cylinder 77, the piston of which is connected to the carriage 4. Another line 78 runs through a pressure regulating valve 79 and then connects to the opposite end of the cylinder 77. A check valve is illustrated at 81. The location of the cylinder 77 may be seen by reference to Figs. 1 and 2. The line 78 has a branch leading to a cylinder 82 and a branch leading to a cylinder 83. The cylinder 82 is illustrated in Fig. 7 and has its piston connected with the ring 44 of one of the clamping devices. The cylinder 83 is shown in Fig. 1 and has its piston connected to the yoke 50 for operating the other clamping device. The line 76 has branches leading to the opposite ends of cylinders 82 and 83. The valve 75 has a shiftable valve member 85 and an exhaust 86 which leads back to the tank 72. A pipe line 90 runs from the pressure line 74 to another valve member 91 similar to the valve 75, the movable valve member 92 of which is shiftable hydraulically by a piston in a cylinder 93, as shown, having a pipe line 94 connecting into one end and a pipe line 95 in the other end, and which run to a pilot valve 97. Pipe line 90 has a branch also running to this pilot valve, and the pilot valve has an outlet 96 for returning liquid to the tank 72. Cylinder 91 has an outlet 89 for returning liquid to the reservoir 72. Pipe lines 98 and 99 connect into opposite ends of a cylinder 100 for shifting a piston therein which is connected to the carrier 69 of the block 65.

The valves illustrated are commercial valves obtainable on the market with hydraulic equipment which includes pump 71, pressure regulators, etc., and the specific construction need not be further considered. It will also be understood that the tank or reservoir 72 may be so located that the several discharge outlets 86, 89 and 96 may discharge thereinto by gravity.

The valve 97 has two arms 101 and 102 which are engageable by two abutments 103 and 104 mounted on the carriage. As the carriage shifts to the left as Fig. 10 is viewed, one abutment strikes the arm 101 and rocks the movable valve member through a distance of about 45° to change the direction of the flow of liquid therethrough. In the reverse movement of the carriage the other abutment strikes the arm 102 and sets the valve member back to the position shown.

The electrical control includes lead wires 110, in one of which is the switch 70 and in which is a solenoid 111 for controlling switch 112. Other lead wires are illustrated at 113 which may come from the same source as the lead wires 110, and conductors 114 and 115 are connected across this line and run through a switch 116 and solenoid 117 for a switch 120. A line 121, in which is located the switch 120, runs to a solenoid 122, and a line 123 returns to the other side of the power line 113. A conductor 125, in which is located the switch 112, runs to the solenoid 126 while a line 127 returns through a switch 130. The switches 116 and 130 are to be mechanically operated by the carriage, and for this purpose have arms 131 and 132 arranged to be engaged by projections 135 and 136 on the carriage.

The operation is as follows: As illustrated in Fig. 10 the parts and valves are positioned with the carriage in its retracted position ready to function upon a tube. As the tube advances, the end thereof engages the arm 67 and causes it to close the switch 70. This energizes solenoid 111 which closes switch 112, thus completing the circuit through the solenoid 126. At this time switch 130 is held closed by the carriage. The action of solenoid 126 is to shift the valve 85 to connect the pressure into the line 78. The oil is conducted through line 78 to the cylinder 77 and the carriage 44 is then moved hydraulically with the tube. Also, the line 78 conducts the liquid to the cylinders 82 and 83 which function to close the clamping jaws 44 (Fig. 7) and to shift the clamping sleeve 17 to the left (Fig. 3) so that the tube is clamped on both sides of the cutters 30. As the carriage starts to move it moves away from the switch 130 which opens, and the solenoid 126 is deenergized. At this time the oil displaced in the several cylinders flows back through line 76 and returns to the reservoir through the valve 75 and outlet pipe 86. As previously described, the movement of the carriage causes the cutters to move inwardly to cut the tube incident to the functioning of the cam 60 and the structure generally shown in Fig. 6. This action preferably starts shortly after the clamping devices are applied to the tube. The preferred timing is that the carriage reaches a speed of movement about equal to that of the tube before the clamps are applied to the tube. The entire carriage now moves forwardly during the cutting action, and it will be understood that the liquid lines which connect to the moving cylinders may be flexible hose connections. At this time the liquid under pressure in line 90 is connected through the valve 97 and line 94 to the upper end of the cylinder 93 so that there is no functioning of the valve 92.

At the end of the movement of the carriage the projection 135 strikes the switch arm 131 and closes this switch, thus energizing solenoid 117 and closing the switch 120. This energizes solenoid 122, and valve member 85 is now shifted back to the position illustrated. The liquid pressure is now reversed and flows through line 76 to the opposite ends of the cylinders 77, 82 and 83 to cause the carriage to shift back to its initial position and to open the tube clamping devices. As soon as the table begins its reverse movement, the projection 135 leaves the switch arm 131, and the switch is opened to deenergize the solenoid 122.

Now it will be appreciated that it is not feasible to remove the severed length of tube so long as one end is situated in the housing 40 and the other end is blocked by the block 65. Therefore, means are provided for shifting the block 65. In the course of the movement of the carriage forwardly with the tube, the projection 104 engages 101 and rocks the movable member of valve 197. This connects the pressure line 90 to the opposite end of cylinder 93 through pipe line 95 and the valve member 92 is shifted by this hydraulic action. This shift connects the line 90 with the line 99 leading into one end of the cylinder 100. The piston in cylinder 100 moves and shifts the block 65 and its carrier 69 transversely away from the end of the tube 1 whereupon an operator may grasp the severed length of tube and remove it with lengthwise movement, pulling its rear end out of the housing 40. The liquid displaced from the cylinder 93 travels back through line 94 through the valve 97 and out the line 96 to the reservoir. Now as the carriage moves back the projection 103 strikes the arm 102 and shifts the valve 97 back to its initial position as shown, thus connecting liquid under pressure through line 94 to cylinder 93 and shifting the valve member 92 back to the position illustrated, thus reversing the liquid under pressure in the cylinder 100, and the block 65 is again located in alignment with the advancing tube. Liquid which is displaced by movement of the valve 92 and which is displaced from the cylinder 100 is transferred back to the reservoir through the outlet 89.

It might be explained that the block 65 of necessity must be removed from in front of the tube prior to the stoppage of the carriage because the tube back of the severed length is advancing with continuous movement. Therefore, after the clamps are applied and the cutting operation is under way the block 65 may be shifted out of the way, and this is done during the course of movement of the carriage. As soon as the carriage stops or starts to move back, the severed length of tube may be pushed forwardly by the oncoming end of the tube entering the cutting apparatus, and this action may be permitted to shift the rear end of the severed length of tube out of the housing 40.

This completes the cycle of operation and when the carriage moves back to its initial position the switch 130 is closed so that the circuit for the solenoid 126 stands ready to be closed by the switch 112 when the end of the advancing tube swings the arm 67. The hydraulic pressure for advancing the carriage is adjusted so that the carriage advances at a rate substantially coordinated with that of the tube and to this end a precise adjustment is one where the carriage neither acts as a drag upon the tube nor acts as a pulling device. The return movement of the carriage may be more rapid, and to this end when the piston 77 is being shifted to return the carriage the liquid is being displaced from the opposite end of the cylinder through the line 78. The check valve 81 may be adjusted to govern the return of the discharge and therefore the rate of the backward travel of the carriage.

We claim:

1. An apparatus for successively cutting lengths from tube of indeterminate length moving continuously longitudinally which comprises, a reciprocable carriage arranged to move with the tube for a distance, clamping means on the carriage for gripping the tube, a rotary head on the carriage through which the tube passes, cutting tools on the rotary head mounted for movement toward and away from the tube, means independent of the clamping means and cutting tools for moving the carriage with the tube and means for automatically applying the clamping means to the tube and for moving the cutting tools inwardly toward the tube for cutting the same as the carriage moves with the tube.

2. An apparatus for successively cutting lengths from tube of indeterminate length moving continuously longitudinally which comprises, a reciprocably mounted carriage, fluid pressure means for moving the carriage with the tube and means for returning the carriage in the opposite direction, clamping means on the carriage, means for urging the clamping means into clamping relationship with the tube as the carriage moves with the tube, a rotary head on the carriage through which the tube extends, cutting tools slidably mounted on the rotary head, and means for moving the cutting tools inwardly as the carriage moves with the tube for cutting the tube.

3. An apparatus for successively cutting lengths from tube of indeterminate length moving continuously longitudinally which comprises, a reciprocably mounted carriage, means deriving power independently of the movement of the tube for moving the carriage with the tube and for moving the carriage back in the reverse direction, a rotary head on the carriage through which the tube extends, movable cutting tools carried by the head and surrounding the tube, clamping means on the carriage arranged to engage the tube on one side of the cutting tools, a second clamping means arranged to engage the tube on the opposite side of the cutting tools, and means for actuating the clamping means into clamping relationship with the tube and for shifting the cutting tools inwardly to cut the tube as the carriage shifts with the tube.

4. An apparatus for successively cutting lengths from tube of indeterminate length moving continuously longitudinally which comprises, a reciprocably mounted carriage, means for moving the carriage with the tube and for moving the carriage back in the reverse direction, a rotary head on the carriage through which the tube extends, movable cutting tools carried by the head and surrounding the tube, clamping means telescopingly arranged within the rotary head and normally free of the tube and positioned to clamp the tube in close proximity to one side of the cutting tools, a second clamping means on the opposite side of the cutting tools, and means operable substantially at the time the carriage shifts with the tube to actuate the clamping means to clamp the tube and to shift the cutting tools inwardly to engage and cut the tube.

5. An apparatus for successively cutting lengths from tube of indeterminate length moving continuously longitudinally which comprises, a reciprocably mounted carriage, power means other than the tube itself for moving the carriage with the tube and then for returning the carriage to its initial position, a rotary head on the carriage through which the tube extends, movable cutting tools on the rotary head, a driving shaft, means having a sliding drive connection with the shaft and operably connected to the rotary head for rotating the head in any position of the carriage, clamping means on the carriage for gripping the tube, and means operable to actuate the clamping means into clamping relationship with the tube and for shifting the cutting tools to cut the tube substantially as the carriage moves with the tube.

6. An apparatus for successively cutting lengths from tube of indeterminate length moving continuously longitudinally which comprises, a reciprocably mounted carriage, means other than the tube itself for moving the carriage with the tube and then for returning the carriage to its initial position, a rotary head on the carriage through which the tube extends, movable cutting tools on the rotary head, a driving shaft, means having a sliding drive connection with the shaft and operably connected to the rotary head for rotating the head in any position of the carriage, clamping means on the carriage for gripping the tube, means operable to actuate the clamping means into clamping relationship with the tube and for shifting the cutting tools to cut the tube substantially as the carriage moves with the tube, and means operable to release the clamping devices and to return the carriage subsequent to the completion of the cutting of the tube.

7. An apparatus for successively cutting lengths from tube of indeterminate length moving continuously longitudinally which comprises, a reciprocably mounted carriage, power means set into operation by the advancing tube for moving the carriage with movement of the tube and for returning the carriage in the opposite direction, a tubular structure on the carriage through which the tube extends, a rotary head supported by the said structural member near one end thereof, shiftable cutting tools carried by the rotary head, a shiftable sleeve surrounding the structural member and operably connected to the cutting tools, and means operable when the carriage moves with the tube for shifting the sleeve to move the cutting tools into cutting relationship as the carriage shifts with the tube.

8. An apparatus for successively cutting lengths from tube of indeterminate length moving continuously longitudinally which comprises, a reciprocably mounted carriage, power means set into operation by the advancing tube for moving the carriage with movement of the tube and for returning the carriage in the opposite direction, a tubular structure on the carriage through which the tube extends, a rotary head supported by the said structural member near one end thereof, shiftable cutting tools carried by the rotary head, a shiftable sleeve surrounding the structural member, a bell crank connecting the sleeve and each cutting tool, and means operable when the carriage moves with the tube for shifting the sleeve to move the cutting tools inwardly into cutting relationship with the tube as the carriage shifts with the tube.

9. An apparatus for successively cutting lengths from tube of indeterminate length moving continuously longitudinally which comprises, a reciprocably mounted carriage, means for moving the carriage with movement of the tube and for returning the carriage in the opposite direction, a tubular structure on the carriage through which the tube extends, a rotary head supported by the said structural member near one end thereof, shiftable cutting tools carried by the rotary head, a shiftable sleeve surrounding the structural member and lying inside the rotary head, means operably associating the heads with the cutting tools, spring means acting upon the sleeve for holding the cutting tools outwardly away from the tube, a fixed element presenting an inclined plane, means operably associated with the sleeve for engaging the inclined plane as the carriage shifts with the tube for shifting the sleeve and urging the cutting tools inwardly to cut the tube, the said means being arranged to move off the inclined plane while the carriage continues to move with the tube whereby the spring shifts the cutting tools out of cutting relationship subsequent to the completion of the cutting operation.

10. An apparatus for successively cutting lengths from tube of indeterminate length moving continuously longitudinally which comprises, a reciprocably mounted carriage arranged to move with the tube and then to move back to initial position, a tubular structural member on the carriage through which the tube extends, a rotary cutting head supported by the structural member and carrying shiftable cutting elements, clamping means for the tube in the form of a tube within the structural member and surrounding the tube to be cut and projecting beyond the structural member at one end, the opposite end of the clamping member being slotted and provided with heads with inclined planes, inclined plane means secured to the structural tube adjacent the cutting tools, and means operable as the carriage shifts with the tube for shifting the clamping tube axially so that interengagement of the inclined planes causes a slotted end of the clamping means to clamp the tube, and means to shift the cutting tools to cut the tube while the same is clamped.

11. An apparatus for successively cutting lengths from tube of indeterminate length moving continuously longitudinally which comprises, a reciprocably mounted carriage having tube cutting means and tube clamping means thereon, hydraulic means including means for supplying liquid under pressure, means operable by liquid under pressure for reciprocating the carriage and for actuating the clamping means, a control valve for the liquid under pressure, conduits leading from the control valve for conducting liquid to the operating means for the carriage and clamping means for actuating the same in opposite manners, means engageable by the end of the advancing tube and operable to shift the control valve for actuation of the clamping means into clamping relationship with the tube and for movement of the carriage with the tube, means operable during movement of the carriage to actuate the tube cutting means, and means for shifting the control valve subsequent to the cutting of the tube for the conveying of liquid under pressure to the means for operating the carriage and clamping means to reverse the movement of the carriage and to release the clamping means.

12. An apparatus for successively cutting lengths from tube of indeterminate length moving continuously longitudinally which comprises, a reciprocably mounted carriage having tube cutting means and tube clamping means thereon, hydraulic means including means for supplying liquid under pressure, means operable by liquid under pressure for reciprocating the carriage and for actuating the clamping means, a control valve for the liquid under pressure, conduits leading from the control valve for conducting liquid to the operating means for the carriage and clamping means for actuating the same in opposite manners, means engageable by the end of the advancing tube and operable to shift the control valve for actuation of the clamping means into clamping relationship with the tube and for movement of the carriage with the tube, means operable during movement of the carriage to actuate the tube cutting means, and means engageable by the carriage substantially at the end of its movement with the tube and operable to shift the control valve in the reverse direction for reverse movement of the carriage and release of the clamping means.

13. An apparatus for successively cutting lengths from tube of indeterminate length moving continuously longitudinally which comprises, a reciprocably mounted carriage having tube cutting means and tube clamping means thereon, hydraulic means including means for supplying liquid under pressure, a control valve in the pressure line, a cylinder having a piston therein connected to the carriage, a cylinder having a piston therein operably connected to the clamping means, conduits extending from the control valve to opposite ends of said cylinders, means engageable by the end of the advancing tube and operable to shift the control valve for conveyance of liquid under pressure through certain of the conduits for movement of the carriage with the tube and for actuation of the clamping means into tube clamping relationship, and means actuated by movement of the carriage substantially at the end of its reciprocable movement and operable to shift the control valve to convey liquid under pressure to the opposite ends of said cylinders for reverse movement of the carriage and release of the clamping means.

14. An apparatus for successively cutting lengths from tube of indeterminate length moving continuously longitudinally which comprises, a reciprocably mounted carriage having tube cutting means and tube clamping means thereon, hydraulic means including means for supplying liquid under pressure, a control valve in the pressure line, a cylinder having a piston therein connected to the carriage, a cylinder having a piston therein operably connected to the clamping means, conduits extending from the control valve to opposite ends of said cylinders, electrical means for shifting the control valve, means operable by the end of the advancing tube and operable to close an electrical circuit for actuating electrical means for shift of the control valve and the introduction of liquid under pressure in the cylinders for movement of the carriage with the tube and for operation of the clamping means, and means operable by the carriage for closing another electrical circuit substantially at the end of the movement of the carriage for energizing electrical means to shift the control valve for return movement of the carriage and release of the clamping means.

15. An apparatus for successively cutting lengths from tube of indeterminate length moving continuously longitudinally which comprises, a reciprocably mounted carriage having tube cutting means and tube clamping means thereon, hydraulic means including means for supplying liquid under pressure, a control valve in the pressure line, a cylinder having a piston therein connected to the carriage, a cylinder having a piston therein operably connected to the clamping means, conduits extending from the control valve to opposite ends of said cylinders, electromagnetic means for shifting the control valve, means engageable by the end of the advancing tube and operable to close an electrical circuit for actuating the electromagnetic means for shift of the control valve and the introduction of liquid under pressure in the cylinders for movement of the carriage with the tube and for operation of the clamping means, a switch in the circuit opened by the carriage upon its initial movement for disabling the electromagnetic means, another circuit, a switch in the circuit engageable by the carriage substantially at the end of its movement for energizing said other circuit for shift of the control valve electromagnetically in the opposite direction to reverse the movement of the carriage and to release the tube clamping means.

16. An apparatus for successively cutting lengths from tube of indeterminate length moving continuously longitudinally which comprises, a reciprocably mounted carriage having tube cutting means and tube clamping means thereon, hydraulic means including means for supplying liquid under pressure, a control valve in the pressure line, a cylinder having a piston therein connected to the carriage, a cylinder having a piston therein operably connected to the clamping means, conduits extending from the control valve to opposite ends of said cylinders, two oppositely acting solenoids effective to shift the control valve, a circuit for one solenoid, a switch in the circuit, means engageable by the end of the advancing tube and operable to close said switch to shift the control valve so as to introduce liquid under pressure to the ends of the cylinders for actuating the clamping means and for shift of the carriage with the tube, means operable by movement of the carriage to break said circuit and deenergize the one solenoid, a circuit for the other solenoid, a switch in the circuit, means engageable by the carriage near the end of its movement for closing the switch in the second mentioned circuit to energize the other solenoid and actuate the control valve in the opposite direction so as to convey liquid under pressure to opposite ends of the cylinders for release of the clamping means and return movement of the carriage.

17. An apparatus for successively cutting lengths from tube of indeterminate length moving continuously longitudinally which comprises, a reciprocably mounted carriage having tube cutting means and tube clamping means thereon, hydraulic means including means for supplying liquid under pressure, a control valve in the pressure line, a cylinder having a piston therein connected to the carriage, a cylinder having a piston therein operably connected to the clamping means, conduits extending from the control valve to opposite ends of said cylinders, two oppositely acting solenoids effective to shift the control valve, a circuit for one solenoid, a switch in the circuit, means engageable by the end of the advancing tube and operable to close said switch to shift the control valve so as to introduce liquid under pressure to the ends of the cylinders for actuating the clamping means and for shift of the carriage with the tube, means operable by movement of the carriage to break said circuit and deenergize the one solenoid, a circuit for the other solenoid, a switch in the circuit, means engageable by the carriage near the end of its movement for closing the switch in the second mentioned circuit to energize the other solenoid and actuate the control valve in the opposite direction so as to convey liquid under pressure to opposite ends of the cylinders for release of the clamping means and return movement of the carriage, said last named means being arranged to break the second mentioned circuit upon reverse movement of the carriage.

18. An apparatus for successively cutting lengths from tube of indeterminate length moving continuously longitudinally which comprises, a reciprocable carriage having tube cutting means and tube clamping means thereon, hydraulic means including means for supplying liquid under pressure, a control valve in the pressure line, cylinders having pistons therein connected to the carriage and to the clamping means, conduits connecting the control valve to opposite ends of the cylinders, means engageable by the end of the advancing tube and operable to cause shift of the control valve for the conduction of liquid to the cylinders for movement of the carriage and operation of the clamping means, a shiftable member upon which the tube engageable means is mounted, hydraulic means operable to shift said member and including a cylinder with connections into opposite ends, a valve in the pressure line, means on the carriage for moving the last named valve to convey liquid under pressure and to one end of the last named cylinder for moving the member out of abutting relationship with the end of the tube to facilitate removal of the severed length of tube, and means on the carriage for shifting the last named valve back to its original position upon reverse movement of the carriage for the conduction of liquid pressure to the opposite end of the last named cylinder to reposition tube engageable means.

19. An apparatus for successively cutting lengths from tube of indeterminate length moving continuously longitudinally which comprises, a reciprocable carriage having tube cutting means and tube clamping means thereon, means for operating the cutting means, actuating means for shifting the carriage with the tube and for operating the clamping means into clamping relationship with the tube and for reversely shifting the carriage and for operating the clamping means to release the tube, a control element engageable by the end of the advancing tube for setting the actuating means into operation for shifting the carriage with the tube and for clamping the tube, means operable substantially at the end of the said movement of the carriage to reverse the action of the actuating means and thereby reverse the movement of the carriage and to release the clamping means, a shiftable member upon which the control element is mounted, and means operable in the course of the movement of the carriage with the tube for moving the shiftable member away from the end of the tube to facilitate removal of the severed length.

RICHARD O. BERG.
SIMON BERG.